UNITED STATES PATENT OFFICE.

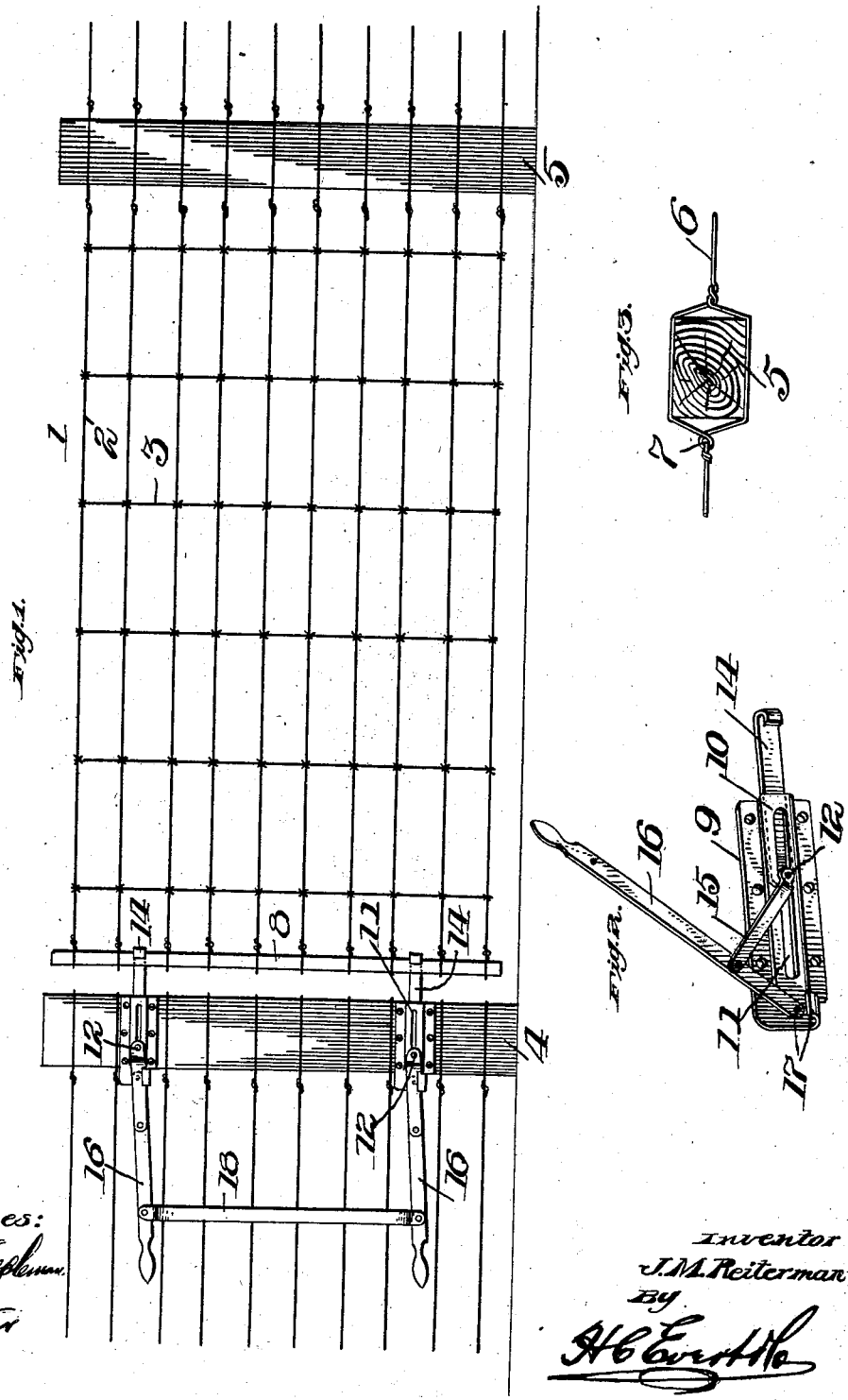

JOSIAH M. REITERMAN, OF FINDLEY, MICHIGAN.

WIRE-STRETCHER FOR GATES.

SPECIFICATION forming part of Letters Patent No. 724,940, dated April 7, 1903.

Application filed August 27, 1902. Serial No. 121,176. (No model.)

*To all whom it may concern:*

Be it known that I, JOSIAH M. REITERMAN, a citizen of the United States of America, residing at Findley, in the county of St. Joseph and State of Michigan, have invented certain new and useful Improvements in Wire-Stretchers for Gates, of which the following is a specification, reference being had therein to the accompanying drawings.
This invention relates to certain new and useful improvements in wire-stretchers for gates and wire fences, and has for its main object to provide means whereby a gate may be securely fastened and at the same time the wire strands held against sagging.

The invention consists in certain new features hereinafter described and claimed, reference being had to the accompanying drawings, in which the same parts are indicated by the same numerals throughout the different views of the figures, in which—

Figure 1 is a side elevation of a line of fence, portions being broken away, provided with my improved fastener and stretcher for a gate. Fig. 2 is a detail perspective view, detached, of one of the stretcher plates and levers. Fig. 3 is a horizontal sectional view of the gate-post, illustrating the manner in which the wire strands are connected thereto.
In the drawings, 1 indicates the gate, made up of a series of longitudinal strands of wire 2 and vertical wires 3, these wires being placed a suitable distance apart as may be desired. The fence-posts 4 and 5 also serve as gate-posts, the strands of wire 6 of the wire fence being wrapped around the post 5, as shown in detail in Fig. 3, and provided with an eye 7, to which the strands of wire 2 of the gate are attached. The fence-strands 6, which are attached to the post 4, are wrapped around in the same manner as above described, except that the eye need not be provided. The strands 2 of the fence are connected at their opposite end to the vertical bar 8, which is grasped by the fastening means whereby the wires of the gate are held taut when the gate is fastened or closed. The fastener is composed of a pair of plates 9, which are rigidly affixed to the side of the post 4 and provided with the guide-bar 10, having the elongated slot 11 therein to permit the operation of the pin 12, which connects the hooked bar 14, which slides behind the guide-bar 10, with the link 15, which attaches the guide-bar indirectly to the operating-lever 16. This lever is pivoted to the plate 9 and is limited in its downward movement by the lug 17, which may be formed integral with the plate 9. These fastening devices are connected so that they will move in unison by the link or cross-bar 18, as seen in Fig. 1. When it is desired to open the gate, the levers 16 are elevated, as shown in Fig. 2, which moves the hooked bars 14 outwardly, whereby the bar 8 can be disengaged from the hook ends of the said bars, and the gate may be swung around beyond the post 5, as will be readily observed by reason of its wires being connected to the eyes 7. When the vertical bar is again engaged with the hooked ends of the bars 14 and the levers thrown down to the position shown in Fig. 1, the gate will be securely fastened and the wires thereof held taut. It will be observed that when in the closed position the levers 16 lie below the horizontal line of their pivot, and consequently will resist any strain of the gate tending to raise said lever, so as to permit a disengagement of the bars 14 from the bar 8.

It will be noted that various changes may be made in the details of construction without departing from the general spirit of my invention.

Having fully described my invention, what I claim as new, and desire to secure by Letters Patent, is—

1. In combination with a wire gate and a post, fastening means therefor embodying a pair of slotted plates secured to said post, hooked bars sliding in said plates, levers pivoted to said plates, links connecting the levers to the hooked bars, and a cross-bar connecting the two levers whereby they are operated in unison, substantially as described.

2. In combination with a wire gate and a post therefor, a slotted plate secured to said post, a hooked bar slidable in said plate to engage the gate, a lever pivoted to the plate, a link connecting said lever to the hooked bar, and means carried by the plate for limiting the downward movement of the lever, substantially as described.

3. In combination with a wire gate having its strands of wire at one end connected to a vertical bar, and a post for said gate, a slotted plate secured to said post, a bar slidable in said plate and adapted for engagement with the vertical bar of the gate, a lever pivoted to the plate, a link connecting said lever to the slidable bar, and means carried by the plate for limiting the downward movement of the lever, substantially as described.

In testimony whereof I affix my signature in the presence of two witnesses.

JOSIAH M. REITERMAN.

Witnesses:
 JOHN E. SCHMIDT,
 ADAM SPIELMANN.